United States Patent Office 3,060,161
Patented Oct. 23, 1962

3,060,161
CATALYTIC PROCESS
Gaetano F. D'Alelio, South Bend, Ind., assignor, by direct and mesne assignments, to Dal Mon Research Co., Cleveland, Ohio, a corporation of Delaware
No Drawing. Filed Apr. 21, 1958, Ser. No. 729,498
32 Claims. (Cl. 260—93.5)

This invention is concerned generally with the polymerization of olefins such as ethylene, propylene, butene-1, styrene, butadiene, isoprene, vinyl cyclohexene and the like olefins with a catalyst comprising the reaction product of (A) at least 1 organometal of the formula $(R)_m(M)(X)_n$ wherein R is a hydrocarbon radical, X is a halogen, M is a metal selected from the class of Ti, Zr, V, Nb, Ta, Cr, Mo, W and Ce, $m$ and $n$ are numerical values of at least 1 and whose sum is at least 3 and corresponds to the valency of M and (B) at least 1 metal selected from the class of M and Al.

The metal halides $M(X)_n$, such as titanium tetrachloride, are similar to the aluminum halides, for example, aluminum chloride, in their behavior as Friedel-Crafts catalysts which are not effective, alone, in converting ethylene to high molecular weight solid polymers. The Friedel-Crafts catalysts are less effective in converting such olefins as propylene, butene-1, hexene-1, vinyl cyclohexene, vinyl cyclohane, etc., to high molecular weight solid polymers, useful rubbery polymers. Many organometal halides, $(R)_mM(X)_n$, can function as Friedel-Crafts catalysts.

It is likewise known that Al and metals of the class M are ineffective polyolefin catalysts. Some organometal halide derivatives have been proposed as polyolefin catalysts, e.g., $(C_5H_5)_2TiCl_2$ [Journal Polymer Science, XXVI, No. 112, pp. 120–123 (1957)] but they are ineffective when used alone, and when used as a complex with $AlR_3$ they are less active catalysts and yield polymers of lower molecular weight than $TiCl_4$—$AlR_3$ type catalysts. Alkyl titanium halides have been proposed as polyolefin catalysts (Belgium Patent 553,478) but they are not effective unless first heated to effect either decomposition or rearrangement, or when used with a secondary complexing catalyst such as $TiCl_3$. It is surprising, therefore, that the reaction product of an organometal, $(R)_mM(X)_n$, of the invention and a metal such as Al and M, produce efficient active polyolefin catalysts capable of producing high density, high molecular weight polyethylene and of producing linear polymers from monoolefins and polyolefins, and of producing copolymers from mixtures of olefins.

The nature of the catalysts of this invention, obtained by reacting the metal with the organometal halide is not known at present and they appear to be complex reaction products. The organometal halide used may be the chloride, the bromide, the fluoride or the iodide, or mixtures of these, but for economic reasons, the chloride is preferred.

The R group in the organometal compound may be an aliphatic hydrocarbon radical such as methyl, ethyl, propyl, butyl, amyl, octyl, dodecyl, allyl, pentenyl-1, pentenyl-2, pentenyl-3, undecanyl-1, dodecenyl-2, etc., or a cycloaliphatic group such as cyclohexanyl, cyclopentanyl, cyclobutanyl, cyclobutenyl, cyclohexenyl, alkylcyclohexanyl, alkylcyclohexenyl, arylcyclohexenyl, cyclopentadienyl, alkylcyclopentadienyl, etc., or an aralkyl radical such as benzyl, 2-phenylethyl, 1-phenylethyl, phenylpropyl, naphthylethyl, phenylethenyl, etc., or the aromatic and alkyl aromatic radicals such as phenyl, tolyl, xylyl, carbazole, naphthyl, methylnaphthyl, diphenyl, terphenyl, etc. Radical groups represented by R which contain less than about 12 carbon atoms in each R group are preferred because of availability and economy. The organometal halide compounds, $(R)_mM(X)_n$, having low stability to air, oxygen and water, whereas the cyclopentadienyl compounds and the aryl compounds show greater stability but all of them should be processed or handled in an inert atmosphere such as in nitrogen or in an inert gas, or in an inert solvent protected with an inert atmosphere, or transferred from one step or operation to another without exposing them to contamination. In many cases, these organometal halides may be used without isolation from the solvent or medium in which they have been prepared.

The organometal halide compounds used in the practice of this invention are prepared by the usual methods regularly used to prepare such compounds. The general method consists in replacing the halogens in a halogen compound of the metal by an organic radical in a step-wise reaction until the desired number of halogen atoms are substituted. The general reaction is illustrated with titanium tetrachloride in its reaction with Grignard reagents or other organometals such as alkyl sodium, alkyl potassium, alkyl lithium or an aryl sodium or lithium, etc. [Chemistry and Industry, 307 (1954); J.A.C.S. 75, 1011 (1953); J.A.C.S., 73, 3877 (1951); J.A.C.S., 75, 3882 (1953); J.A.C.S., 76, 2278 (1954); J.A.C.S., 76, 4281 (1954).] It is possible, by step-wise substitution, to produce the organometal compounds used in this invention, which have more than 1 type of hydrocarbon attached to the metal atom, for example,

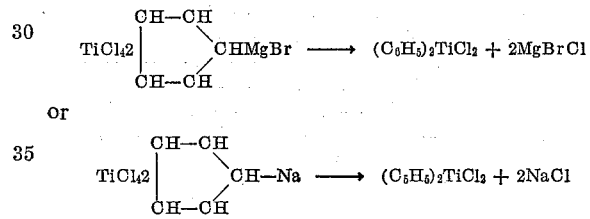

or

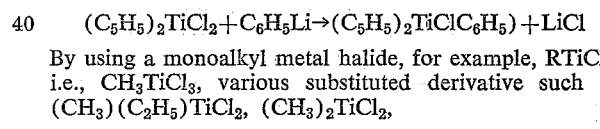

then $(C_5H_5)_2TiCl_2 + C_6H_5Li \rightarrow (C_5H_5)_2TiClC_6H_5) + LiCl$

By using a monoalkyl metal halide, for example, $RTiCl_3$, i.e., $CH_3TiCl_3$, various substituted derivative such as $(CH_3)(C_2H_5)TiCl_2$, $(CH_3)_2TiCl_2$, $(CH_3)(C_2H_5)(C_3H_7)TiCl$ $(CH_3)_3TiCl_3$, $(CH_3)(C_4H_9)_2TiCl$, $(CH_3)(C_5H_5)_2TiCl$ may be prepared by substitution reactions. Likewise $(R_1)(R_2)TiX_2$ may be used as a starting point for further substitution [J. Chem. Soc., p. 2773 (1952).]. In these organometal halides the R group may be the same or different. Some other compounds for the preparation of the catalyst used in the practice of this invention, in which the R groups may be the same or different are $R_3ZrX$, $R_2ZrX_2$, $RZrX_3$, $R_3VX$, $R_2VX_2$, $RVX_3$, $R_2NbX_2$, $R_2TaX_2$, $R_3TaX$, $R_3MoX$, $R_2MoX_2$, $R_2MOX_3$, $R_3WX$, $R_2WX_2$, $R_2WX_3$, etc., in which R is a hydrocarbon and X is a halogen [J.A.C.S., 75, 4281 (1954)].

The metal atom, M, in the organometal compound may be the same or a different atom from the metal used in the reaction with the organometal, for example, the components may be Ti and $(R)_mTi(X)_n$, Zr and $(R)_mZr(X)_n$, V and $R_mV(X)_n$, etc., when the metal atoms are the same; or Ti and $(R)_mZr(X)_n$, Zr and $(R)_mTi(X)_n$, V and $(R)_mM(X)_n$, Al and $(R)_mTi(X)_n$, Al and $(R)_mZr(X)_n$, Al and $(R)_mMO(X)_n$, etc., when the metal atoms are different.

The ratio of the metal to the organometal halide that may be used in the preparation of the catalysts of this invention is not critical and may be from 1 part metal to 100 parts of organometal halide to 100 parts metal to 1 or less part organometal halide. Satisfactory results are obtained in a range of from 1 part metal to 10 parts organometal halide to 10 parts metal to 1 part organometal halide. It has been found also that the nature of the catalyst resulting from the ratio of the metal to the organometal halide, for example, methyl titanium trichloride, determines to some extent the nature of the polymer. If large amounts of the halide are used, or if the reaction between the metal and the organometal halide is incomplete so that there remains an excess of the halide, lower molecular weight polymers are obtained than if lesser amounts of the halide are present. The ratio of the metal to the organometal halide may be used to control the molecular weight of the polymer or copolymer desired.

As a polymerization medium substantially any inert material may be used which is liquid under the conditions of the temperature employed in the polymerization. Hydrocarbon solvents are preferred and are preferably free substantially of materials that react with the catalysts such as $O_2$, $H_2O$, alcohols, ketones and the like. Suitable solvents include pentane, hexane, cyclohexane, octane, benzene, toluene, xylene, chlorobenzene and the like. In some cases, the polymerization may be carried out in the absence of a liquid medium. In other cases, the monomer or mixtures of monomers themselves, if liquid, may be used as the polymerization medium, such as styrene, isoprene, 2,3-dimethyl butadiene, vinyl cyclohexane, vinyl cyclohexene, and the like.

The catalysts of this invention are useful in polymerizing olefins having a $CH_2=C<$ group, and include such monomers as hexatriene; hexadiene-1,5; pentadiene-1,3; allene, diallyl; dimethallyl; 2,4,4-trimethyl pentene-1; methyl pentadiene-1,3, etc., as well as mixtures containing cyclopentadiene, myrcene, alpha methyl styrene, etc.

The amount of catalyst may be varied over a wide range. Relatively small amounts are operable to form relatively large amounts of polymer. In general, a practical range is 0.001 to 0.1 part of catalyst per part of olefin polymerized. Even larger amounts of catalyst are operable but large amounts are uneconomical and make the polymer more difficult to purify. When low molecular weight polymers are obtained by the process of this invention, they are useful as chemical intermediates in alkylation, epoxidation, chlorination, sulfonation, etc., and as plasticizers for the solid polymers produced by the procedures described herein. The catalysts as prepared in the practice of this invention are useful in polymerizing olefins at temperatures ranging from below or about room temperature to temperatures of 200° C. or even higher and at pressures ranging from atomspheric or a few atmospheres to pressures as high as 10,000 p.s.i. or higher. For practical operations, temperatures in the range of 20–200° C. and pressures of 100–2000 p.s.i. are suitable. The following examples illustrate without limiting the invention.

The catalysts used in the practice of this invention may be prepared by reacting the metal with the organometal halide in any suitable manner. Preferably the metal should be in a finely divided form and mixed with the organometal halide but the metal may be in wire, granular, ribbon or screen form, and in some cases may be the liner of the reaction vessel in which the polymerization is performed.

The catalysts of this invention may be prepared simply by mixing the metal or a mixture of metals with an organometal halide, or mixture of halides, or they are mixed in the presence of an inert solvent or medium such as the hydrocarbons, for example, hexane, heptane, benzene, toluene, cyclohexane, or mixtures of hydrocarbons, and, in some cases, ethers, such as diethyl ether, tetrahydrofurane and the like may be used alone or in conjunction with a hydrocarbon or a halogenated hydrocarbon, as for example, chlorobenzene. After mixing of the metal and the organometal halide, the catalyst may be used as such or the mixture may be heated to the boiling point of the solvent at subatmospheric, atmospheric or superatmospheric pressure, or, if the metal and the organometal halide are added to a suitable reactor, they may be added at room temperature or below room temperature and heat applied to the reactor before or during the addition of the olefin. Alternately, and preferably, the mixture of the metal and the organometal halide may be ground or milled together for a suitable time to produce an active polymerization catalyst for olefins. Also they may be heated together at temperatures above room temperature and preferably at temperatures between 50–200° C. to produce a catalyst suitable for the polymerization of olefins. The catalyst prepared by heating the metal and the organometal halide may be ground or ball-milled after heating to increase the activity of the catalyst, or the mixture may be ground simultaneously with heating. The grinding and milling operations may be performed as a dry operation in the absence of an inert hydrocarbon. Sometimes it is more convenient to wet grind the mixture of the metal and the aluminum halide by adding an inert hydrocarbon to the mixture to be ground or ball-milled. The hydrocarbon, if used, is preferably one that will not interfere with the subsequent polymerization reaction and is preferably the same hydrocarbon used in the polymerization reaction. Also the milling or grinding can be carried out partly by dry grinding in an inert atmosphere and then an inert hydrocarbon added to the mill toward the end of the milling in order to slurry the product for ease of handling.

The following examples illustrate without limiting the invention.

*Example I*

Two and three-tenth (2.3) grams of $(C_4H_9)_2TiCl_2$ and 0.75 gram of finely ground aluminum are added to 100 ml. of toluene in a stainless steel reactor equipped with stirrer, inlet port, heating means, etc. The transfer of the catalyst components to the reactor is made in an inert atmosphere to avoid contamination with moisture and oxygen. The reactor is then heated to 125–150° C. and pressured with ethylene to 600–900 p.s.i. Ethylene is rapidly absorbed and the reactor is repressured from time to time to replace the ethylene consumed. After 6 hours, even though the system is still absorbing ethylene, the run is terminated, the autoclave cooled, vented, opened, and the crude, solid polyethylene transferred to a container containing about 200 ml. of methanol acidified with HCl and refluxed for 1 hour. The purified solid white polyethylene is then separated by filtration and dried. The yield is about 109 grams.

Similar results are obtained when other organometal compounds such as $(CH_3)_3TiCl$, $(C_4H_9)_3TiCl$, $(C_2H_5)_2ZrCl_2$, $(C_5H_{11})_2ZrCl_2$ or compounds of the formula $(R)_mM(X)_n$, as described hereinabove are used instead of $(C_4H_9)_2TiCl_2$. Likewise the fluoride, the bromide, the iodide may be used in place of the chloride.

Substitution of the ethylene by other olefins, such as $CH_2=CHCH_3$,

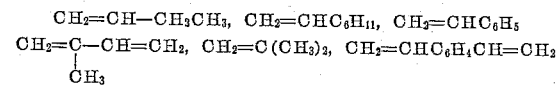

etc. produces the corresponding polymer.

*Example II*

Two and eight-tenths (2.8) grams of $C_5H_{11}TiCl_3$ and 1.2 grams of Al 10 ml. heptane are refluxed for 2 hours in an inert atmosphere in a 1-liter reactor equipped with stirrer, heating and cooling means. Two hundred ml. of heptane are first added and propylene is added to the reaction flask continuously over a period of 5 hours and 79 grams of solid polypropylene is isolated. When butene-1, styrene, vinyl cyclohexane and vinyl cyclohexene are substituted for the propylene, the corresponding polymer is obtained. A very active polymerization catalyst may also be prepared by using $(C_4H_9)_2VCl$, or $(C_4H_9)_2TiCl$, $(C_4H_9)_2MoCl$ or the corresponding zirconium derivatives instead of the $C_5H_{11}TiCl_3$ of this example.

*Example III*

The procedure of Example I is repeated to produce copolymers from mixtures of olefins containing at least 2 monomers such as 10–90 parts of ethylene to 90–10 parts propylene; 5–95 parts styrene to 95–5 parts vinyl cyclohexane; 2–98 parts propylene to 98–2 parts isoprene, etc.; tripolymers such as those of (1) styrene, vinyl cyclohexane; (2) propylene, butadiene and isoprene; (3) divinyl benzene, styrene, hexene-1, etc., in which the monomer concentrations may be varied over wide ratios may also be prepared by the use of the catalyst of this example.

*Example IV*

To the catalyst of Example II, 80 grams of liquid isoprene is added slowly over a period of 2 hours and the mixture is heated to 50° C. for 3 hours, after which it is cooled and the product added to 1 liter of methanol to precipitate the polymer. Two grams of phenyl-β-naphthyl amine is added to the polymer which is then washed with water and dried. Thirty parts of this polymer are compounded with 1 part of zinc oxide, 1 part of stearic acid, 0.2 part of mercaptobenzothiazole and 0.75 part of sulfur and vulcanized at 270° F. for 25 minutes to produce a vulcanized product with properties similar to those of vulcanized natural rubber. Butadiene, phenylbutadiene, 2,3-dimethylbutadiene, etc., may be used alone or in combinations with other dienes, trienes and monoolefins to produce vulcanizable compositions containing reactive residual double bonds in the polymer.

*Example V*

Twenty-five parts of a commercial divinyl benzene containing approximately 50 percent of divinyl benzene and 50 percent of ethyl styrene are added slowly at 50° C. and with stirring to 100 parts of toluene containing the catalyst of Example I. The reaction is performed in a suitable reactor, equipped with a stirrer, and maintained in an inert atmosphere. Upon completion of the addition of the divinyl benzene mixture, the reaction is continued for 5 hours, after which it is cooled and added to a liter of methanol acidified with HCl. The polymer is isolated by filtration, dried in a vacuum desiccator and stored under nitrogen. About 20 parts of polymer are obtained which contains unsaturation corresponding to a copolymer of the structure

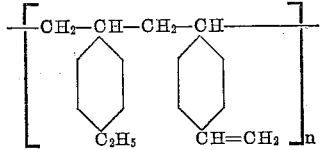

On heating the polymer converts, especially in the presence of air to an insoluble, infusible polymer. In the presence of a catalyst, as for example, the percatalysts such as benzoyl peroxide, a catalytic conversion to the insoluble, infusible state is obtained rapidly.

*Example VI*

Five grams of finely ground titanium and 4 grams of butyl titanium trichloride are ground in an atmosphere of pure nitrogen for 200–300 hours in a conventional stainless steel ball-mill of about 4 ounce capacity about ½ full of ½-inch stainless steel balls. Three grams of the resulting catalyst are suspended in 50 ml. of toluene in a 200 ml. stainless steel, stirred autoclave. The transfer from the mill to the autoclave is made in a dry box under a slight pressure of nitrogen to avoid contamination with moisture and oxygen. After the catalyst is transferred, the autoclave is sealed and pressured with ethylene to about 500 p.s.i. and heated to a temperature of about 150° C. During the polymerization reaction frequent repressuring with ethylene is necessary. At the end of the 16 hours, the polymerization is stopped even though ethylene is still being absorbed. The reactor is cooled, vented and opened, and the crude polyethylene transferred to a container containing 500 ml. of methanol acidified with HCl and refluxed for 2 hours. The purified solid white polyethylene is separated by filtration and dried and weighs about 143 grams.

If instead of titanium there is used zirconium, vanadium, niobium, tantalum, chromium, molybdenum, tungsten and cerium or a mixture of these metals along or with aluminum, catalysts suitable for the polymerization of olefins is obtained. If instead of butyl titanium trichloride, the other organometals of the formula $(R)_mM(X)_n$ are used, similar active polymerization catalysts are obtained.

*Example VII*

An electrically heated vertical furnace made of a quartz tube 10 inches long and ¾ inch I.D. wrapped with electrically heating resistance wire is filled with a mixture of 5 grams of vanadium and 5 grams of $(C_6H_5)_2VCl$ and the gas in the tube replaced by helium to give an inert atmosphere. The furnace is then heated to about 190° C. for 8–12 hours. Any product that sublimes from the reaction mixture may be returned to the reaction or may be replaced by new chloride by passing a heated inert gas such as helium or a noble gas through heated chloride and passing this gas through the tube. Alternately the vanadium and the organometal halide may be sealed in the quartz tube and the sealed tube heated. The reaction product may be used directly as in Example I to give an excellent yield of high molecular weight, high density polyethylenes. The activity of the catalyst can be increased by balling the catalyst prepared by heating the metal and the organometal halide. The cooled catalyst is transferred in an inert medium and ground in a ball mill according to the procedure of Example VI for 72–144 hours. This ground catalyst is used to polymerize ethylene at temperatures between 50–100° C. and at pressures between 250–500 p.s.i.

*Example VIII*

The catalyst of Example II is placed in a 200 ml. capacity stainless steel rocking autoclave containing 50 ml. heptane. The autoclave is connected to a source of propylene, sealed and heated to a reaction temperature of 75° C. The propylene pressure is initially 160–175 p.s.i. and from time to time over a period of 24–36 hours is repressured with propylene as the polymerization proceeds. At the end of the reaction, the autoclave is cooled, vented, and the reaction mixture transferred to a container containing 200 ml. of methanol acidified with HCl and boiled for 30 minutes. The purified solid polypropylene is then removed by filtration and dried; yield 52 grams. Substitution of the propylene by butene-1, hexene-1, octene-1, vinylcyclohexane and vinylcyclohexene produce the corresponding polymers, whereas of these monomers produce copolymers.

*Example IX*

Catalysts similar to those of Examples VII and VIII may also be prepared by reacting the metal and the organometal halide in a stainless steel ball mill heated electrically to 100° C., thereby combining a heating and grinding operation in one step to produce active catalysts suitable for polymerizing a wide range of olefins.

The catalysts of this invention are very reactive ionic catalysts and pyrophoric. Surprisingly they also form complexes with organometal compounds such as for example the metal alkyls, e.g., phenyllithium, butyllithium, cyclohexyllithium, lithium aluminum tetrabutyl, Grignard reagents, etc. These complexes are active olefin catalysts especially useful in the production of cis polymers of isoprene, butadiene and other conjugated dienes and diolefins as well as copolymers of monoolefins and diolefins.

*Example X*

Under inert conditions, there is added to 5 grams of the catalyst of Example II dispersed in 20 ml. of hexane, 2 grams of butyllithium in 10 ml. of hexane, and to this mixture there is added 50 grams of isoprene with 200 grams of hexane and the mixture maintained at room temperature to 50° C. for 24 hours, after which 500 ml. of methanol is added to the polymer dispersion and refluxed for about ½ hour. The solvent is decanted from the polymer and vacuum dried. Yield of rubbery polymer, 41 grams. When styrene is used with the catalyst of this example, a fibrous polystyrene is obtained, and mixtures of styrene or other vinyl aryls with dienes or diolefins such as butadiene or isoprene, clear high impact copolymers are obtained.

I claim:

1. The process of polymerizing a hydrocarbon monomer having a $CH_2=C<$ group and no more than about 11 carbon atoms therein at a temperature in the range of about 20–200° C. in an inert medium with a catalyst comprising the reaction product of (A) at least 1 organometal halide of the formula $(R)_mM(X)_n$ wherein M is a metal selected from the group of Ti, Zr, V, Nb, Ta, Cr, Mo, W and Ce, R is a hydrocarbon radical having no more than about 12 carbon atoms therein, X is a halogen, $m$ and $n$ are numerical values of at least 1 and whose sum is at least 3 and corresponds to the valency of M, and (B) at least 1 metal selected from Al and M, said reagents being reacted at a temperature in the range of room temperature to about 200° C. and in proportions of 0.01–100 parts by weight of organometal halide per part by weight of metal.

2. The process of claim 1 in which X is chlorine.

3. The process of polymerizing a hydrocarbon monomer having a $CH_2=C<$ group and no more than about 11 carbon atoms therein at a temperature in the range of about 20–200° C. in an inert solvent with a catalyst comprising the reaction product of claim 1.

4. The process of claim 3 in which X is chlorine.

5. The process of polymerizing a hydrocarbon monomer having only one $CH_2=C<$ group and no more than about 11 hydrocarbon atoms therein at a temperature in the range of room temperature to about 200° C. in an inert solvent with the catalyst of claim 2.

6. The process of polymerizing a hydrocarbon monomer having two $CH_2=C<$ groups and having no more than about 11 carbon atoms therein at a temperature in the range of room temperature to about 200° C. in an inert solvent with the catalyst of claim 2.

7. The process of polymerizing a mixture of at least 2 hydrocarbon monomers each having a $CH_2=C<$ group and each having no more than about 11 carbon atoms therein at a temperature in the range of room temperature to about 200° C. in an inert solvent with the catalyst of claim 2.

8. The process of polymerizing a hydrocarbon monomer having a $CH_2=C<$ group and having no more than about 11 carbon atoms therein at a temperature in the range of room temperature to about 200° C. that comprises heating said monomer in an inert solvent with the catalyst of claim 2.

9. The process of polymerizing a hydrocarbon monomer having only one $CH_2=C<$ group and no more than about 11 carbon atoms therein at a temperature in the range of room temperature to about 200° C. that comprises heating said monomer in an inert solvent with the catalyst of claim 2.

10. The process of polymerizing a hydrocarbon monomer having a plurality of $CH_2=C<$ groups and having no more than about 11 carbon atoms therein at a temperature in the range of room temperature to about 200° C. that comprises heating said monomer in an inert solvent with the catalyst of claim 2.

11. The process of claim 1 in which the catalyst is complexed with an organometal.

12. The process of claim 1 in which said monomers is ethylene and the metal is Ti.

13. The process of claim 1 in which said monomer is a hydrocarbon of at least 3 carbon atoms and the metal is Ti.

14. The process of claim 1 in which said monomer is propylene and the metal is Ti.

15. The process of claim 1 in which said monomer is butene-1 and the metal is Ti.

16. The process of claim 1 in which said monomer is styrene and the metal is Ti.

17. The process of claim 1 in which said monomer is a diene and the metal is Ti.

18. The process of claim 1 in which said monomer is butadiene and the metal is Ti.

19. The process of claim 1 in which said monomer is isoprene and the metal is Ti.

20. The process of claim 1, in which the metal is aluminum.

21. The process of claim 1, in which the metal it titanium.

22. The process of claim 1, in which the metal is zirconium.

23. The process of claim 1, in which the metal is vanadium.

24. The process of claim 1, in which the metal is molybdenum.

25. The process of claim 1, in which the organometal halide is an organotitanium chloride.

26. The process of claim 1, in which the organometal halide is an organozirconium chloride.

27. The process of claim 1, in which the organometal halide is an organovanadium chloride.

28. The process of claim 1, in which the organometal halide is an organomolybdenum chloride.

29. The process of claim 1, in which the metal is aluminum and the organometal halide is an organotitanium chloride.

30. The process of claim 1, in which the metal is aluminum and the organometal halide is an organozirconium chloride.

31. The process of claim 1, in which the metal is aluminum and the organometal halide is an organovanadium chloride.

32. The process of claim 1, in which the metal is aluminum and the organometal halide is an organomolybdenum chloride.

References Cited in the file of this patent

UNITED STATES PATENTS

| | | |
|---|---|---|
| 2,827,446 | Breslow | Mar. 18, 1958 |
| 2,879,263 | Anderson et al. | Mar. 24, 1959 |
| 2,899,416 | Schreyer | Aug. 11, 1959 |
| 2,905,645 | Anderson et al. | Sept. 22, 1959 |

FOREIGN PATENTS

| | | |
|---|---|---|
| 538,782 | Belgium | Dec. 6, 1955 |

OTHER REFERENCES

Natta et al.: J.A.C.S. 79, p. 2975 (1957). Copy in Sci. Lib.

Bessant et al.: Reports on the Progress of Applied Chem., vol. 42 (1957), pp. 422–441. Copy in Dept. of Agriculture Lib.

Gaylord et al.: "Linear and Stereoregular Addition Polymers," page 169, Interscience Publishers, Inc., New York, 1959. (Copy in Scientific Library.)